United States Patent
Hwang

(10) Patent No.: US 11,140,366 B2
(45) Date of Patent: Oct. 5, 2021

(54) VEHICLE AND METHOD OF PROVIDING REAR IMAGE THEREOF

(71) Applicants: HYUNDAI MOTOR COMPANY, Seoul (KR); KIA MOTORS CORPORATION, Seoul (KR)

(72) Inventor: Seung Hai Hwang, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/930,649

(22) Filed: Jul. 16, 2020

(65) Prior Publication Data
US 2021/0152785 A1    May 20, 2021

(30) Foreign Application Priority Data

Nov. 18, 2019  (KR) .................... 10-2019-0147327

(51) Int. Cl.
| | |
|---|---|
| H04N 7/18 | (2006.01) |
| H04N 5/225 | (2006.01) |
| H04N 5/232 | (2006.01) |
| G06T 7/11 | (2017.01) |
| G06T 3/40 | (2006.01) |
| B60R 1/00 | (2006.01) |

(52) U.S. Cl.
CPC .............. *H04N 7/183* (2013.01); *B60R 1/00* (2013.01); *G06T 3/40* (2013.01); *G06T 7/11* (2017.01); *H04N 5/2253* (2013.01); *H04N 5/23296* (2013.01); *B60R 2300/10* (2013.01); *B60R 2300/20* (2013.01); *B60R 2300/802* (2013.01); *G06T 2207/20132* (2013.01); *G06T 2207/30252* (2013.01)

(58) Field of Classification Search
CPC ...... H04N 7/183; H04N 5/23296; G06T 7/11; G06T 3/40; B60R 1/00; B60R 2300/8066; B60R 2300/806
See application file for complete search history.

(56) References Cited

U.S. PATENT DOCUMENTS

| | | | |
|---|---|---|---|
| 9,723,192 B1 * | 8/2017 | Sammons | F16M 11/242 |
| 2016/0227098 A1 * | 8/2016 | Yasuhara | B60R 1/00 |
| 2016/0325680 A1 * | 11/2016 | Curtis | H04N 5/2628 |
| 2019/0322222 A1 * | 10/2019 | Kondou | H04N 7/181 |
| 2019/0361436 A1 * | 11/2019 | Ueda | G06K 9/00791 |

* cited by examiner

*Primary Examiner* — Rebecca A Volentine

(57) ABSTRACT

A vehicle includes a camera for capturing a rear image and effectively outputs a rear image captured through a mobile device when the vehicle does not include a display. A method of providing the rear image of the vehicle includes: setting a data path with a smart device, acquiring a rear image from a rear camera of the vehicle, correcting the acquired rear image based on a vehicle speed and delay that occurs in the data path, and transmitting the corrected image to the smart device.

7 Claims, 5 Drawing Sheets

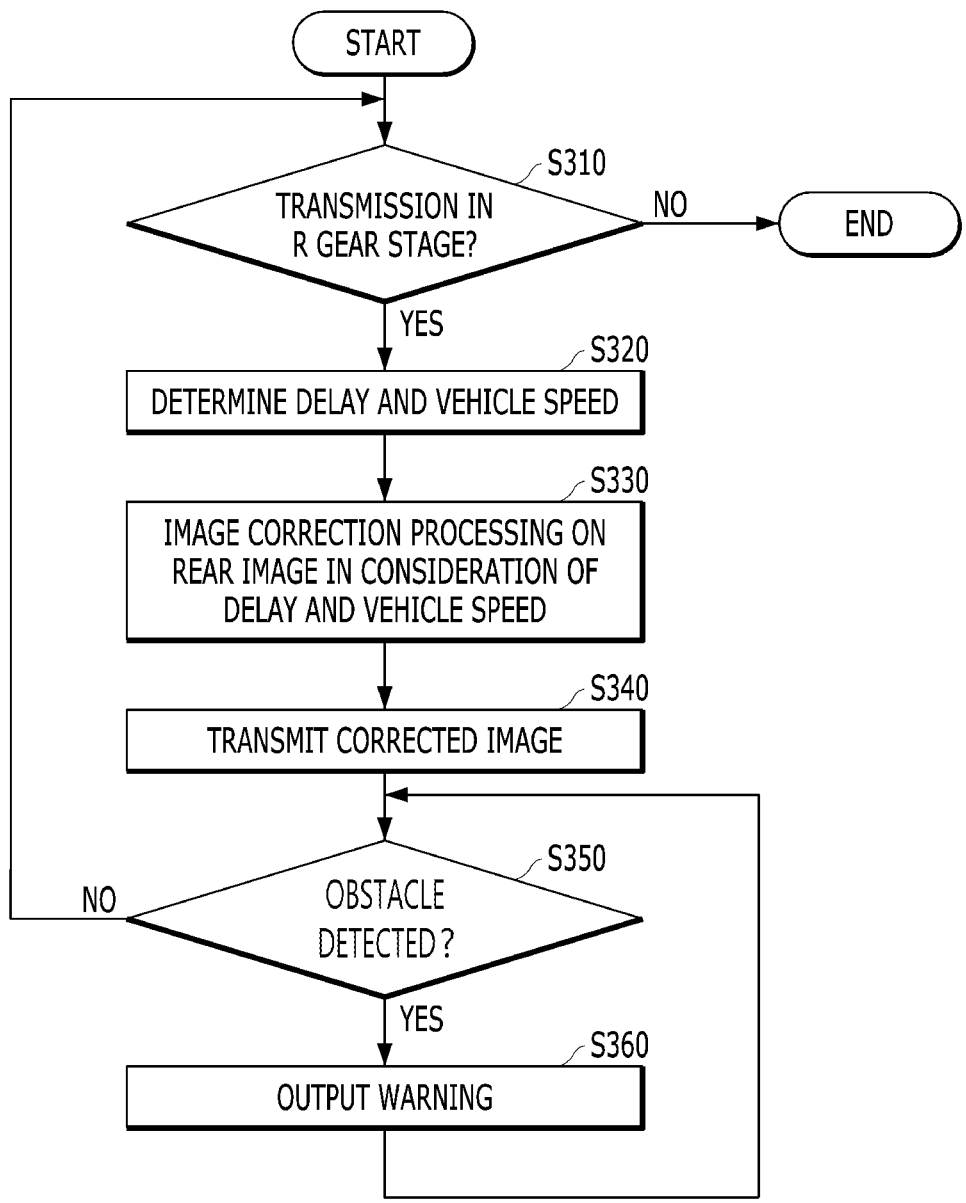

VEHICLE AND METHOD OF PROVIDING REAR IMAGE THEREOF

This application claims priority to and the benefit of Korean Patent Application No. 10-2019-0147327, filed on Nov. 18, 2019, the entire contents of which are hereby incorporated by reference.

FIELD

The present disclosure relates to a vehicle that includes a camera for capturing a rear image and effectively outputs a rear image captured through a mobile device, and a method of providing a rear image of the vehicle.

BACKGROUND

The statements in this section merely provide background information related to the present disclosure and may not constitute prior art.

Recently, a significant number of vehicles have had in-vehicle displays, e.g., a display of an audio/video/navigation (AVN) system and a rear camera installed therein from the release of the vehicles, and thus, have provided a rear image to a driver through the display when a rear gear stage is input. However, in some countries in which low-cost vehicles with low specification are preferred, only a rear camera is optionally selected, and a method of replacing a navigation and display function of the AVN system with a smartphone of a passenger, which is wirelessly connected to the vehicle, has been widely applied.

SUMMARY

The present disclosure provides a vehicle and a method of providing a rear image to overcome image delay due to communication delay between a vehicle and a terminal in an environment in which a rear image is output through a separate terminal connected to the vehicle.

The technical problems solved by the forms are not limited to the above technical problems and other technical problems which are not described herein will become apparent to those skilled in the art from the following description.

In one form of the present disclosure, a method of providing a rear image of a vehicle includes: setting, by a processor, a data path with a smart device; acquiring, by the processor, a rear image from a rear camera of the vehicle; correcting, by the processor, the acquired rear image based on a vehicle speed of the vehicle and a delay that occurs in the data path; and transmitting, by the processor, the corrected image to the smart device.

In another aspect of the present disclosure, a method of providing a rear image of a vehicle includes: setting a data path between a smart device and a vehicle, transmitting a rear image acquired from a rear camera of the vehicle to the smart device, determining delay that occurs on the data path by the smart device, providing a vehicle speed to the smart device by the vehicle, correcting the rear image based on the delay and the vehicle speed by the smart device, and outputting the corrected rear image through a display of the smart device.

In another aspect of the present disclosure, a vehicle includes: a rear camera, and an image processor configured to set a data path between a smart device and the vehicle, to acquire a rear image from the rear camera, to correct the acquired rear image in consideration of a vehicle speed and delay that occurs in the data path, and to transmit the corrected image to the smart device.

In another aspect of the present disclosure, a system for providing a rear image of a vehicle includes: a smart device, and a vehicle configured to set a data path with the smart device. In particular, the vehicle transmits to the smart device a vehicle speed and a rear image acquired from the rear camera of the vehicle, and the smart device determines whether a delay occurs in the data path, corrects the rear image based on the delay and the vehicle speed, and outputs the corrected rear image through a display of the smart device.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is a flowchart showing an example of a procedure of outputting a rear image in one form of the present disclosure;

Figure 1:
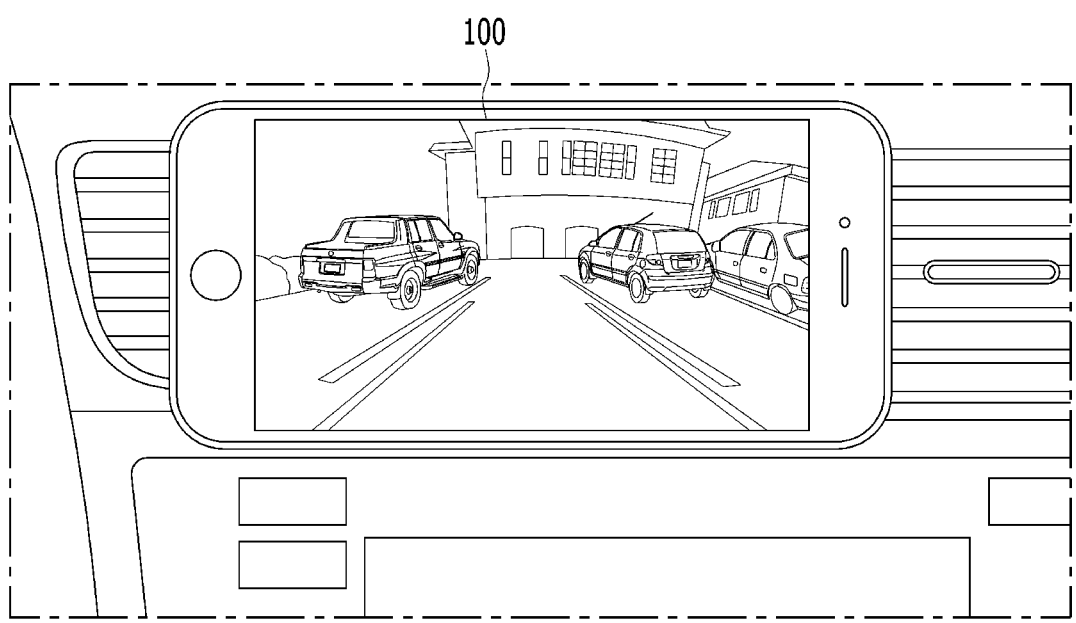
FIG. 1 is a diagram showing a rear image of a vehicle which is provided through a display of a general smart device.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Exemplary forms of the present disclosure are described in detail so as for those of ordinary skill in the art to easily implement with reference to the accompanying drawings. However, the present disclosure may be implemented in various different forms and is not limited to these forms. To clearly describe the present disclosure, a part without concerning to the description is omitted in the drawings, and like reference numerals in the specification denote like elements.

In addition, when a certain part "includes" a certain component, this indicates that the part may further include another component instead of excluding another component unless there is no different disclosure. The same reference numbers will be used throughout the drawings and the specification to refer to the same parts.

FIG. 1 is a diagram showing an example of the case in which a rear image of a vehicle is provided through a display of a general smart device.

Referring to FIG. 1, when a smartphone 100 and a vehicle are capable of communicating with each other through a predetermined protocol such as WiFi, even if a display is not installed in the vehicle, the vehicle may transmit an image of a rear camera to the smartphone 100 supported in the vehicle, and thus, the image of the rear camera may be output through the display of the smartphone 100.

However, we have discovered that when the rear image of the vehicle is output in this manner, delay occurs in communication between a vehicle and a smart device, and an image displayed in the smart device is delayed by communication delay, and accordingly, there is a problem in that it is not possible to express a sense of actual distance.

According to one form of the present disclosure, when a vehicle that includes a rear camera but does not include a display device for outputting an image captured by a rear camera, the captured image by the rear camera may be transmitted through a terminal connected to the vehicle, and an image process may be applied in consideration of communication delay between the vehicle and the terminal and a reverse vehicle speed. Accordingly, an image delay phenomenon may be reduced and a sense of unfamiliarity between an actual rear environment and an output image may be reduced.

Figure 2:
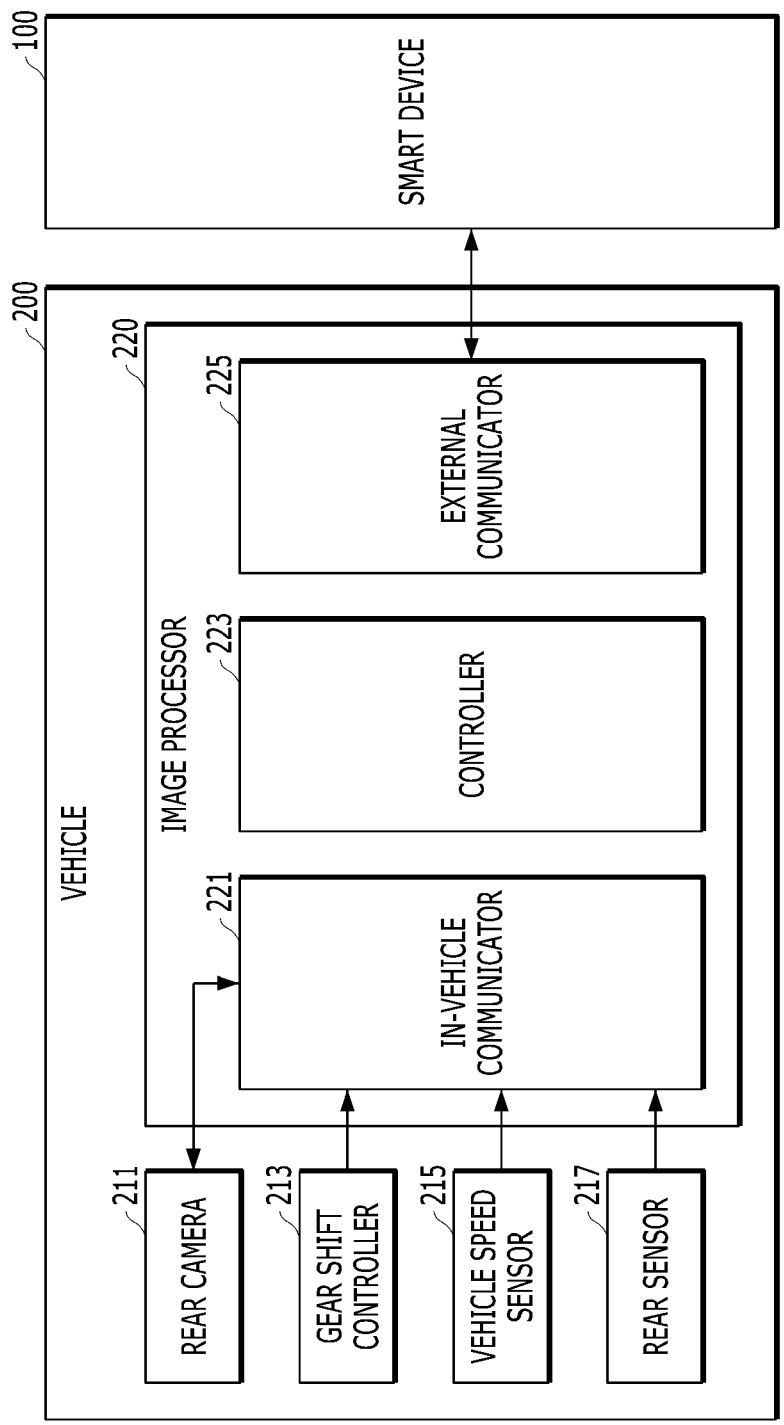
FIG. 2 is a block diagram showing an example of a configuration of a rear image output system in one form of the present disclosure.

FIG. 2 is a block diagram showing an example of a configuration of a rear image output system according to one form of the present disclosure.

Referring to FIG. 2, the rear image output system may include a smart device 100 and a vehicle 200.

It may be sufficient that the smart device 100 includes: a communication module (not shown) for communication with the vehicle 200, a display (not shown) for outputting an image acquired through the communication module, and a controller (not shown) for controlling the communication module and the display. Thus, the smart device 100 may not necessarily include a component such as a general smartphone or smart tablet, and needless to say, the smart device 100 may be any type of a separate portable terminal for performing a function to be described in the present disclosure.

The vehicle 200 may include: information input devices 211, 213, 215, and 217 and an image processor 220 for processing a rear camera image based on information acquired from the information input device and transmitting the rear camera image to the smart device 100.

In more detail, the information input device may include a rear camera 211, a gear shift controller 213, a vehicle speed sensor 215, and a rear sensor 217.

The rear camera 211 may be disposed on a rear surface of the vehicle, for example, a portion around a trunk lid or a portion around a number plate and may acquire an image of the rear sided of the vehicle. The rear camera 211 may have an optical zoom function having a predetermined magnification. In some forms, when the rear camera 211 has a zoom function, zoom magnification may also be changed according to control of the image processor 220.

The gear shift controller 213 may perform a function of providing information on a current gear stage as well as general control of a transmission.

The vehicle speed sensor 215 may perform a function of detecting a current vehicle speed and providing the same. Needless to say, the vehicle speed sensor 215 may also be replaced with another type of component as long as the component simply provides information on a vehicle speed.

For example, the vehicle speed sensor 215 may also be replaced with a cluster controller.

The rear sensor 217 may detect whether a vehicle approaches an obstacle behind the vehicle and may be embodied in the form of a general ultrasonic sensor, but the present disclosure is not limited thereto. In some forms, the rear sensor 217 may be omitted.

The image processor 220 may include an in-vehicle communicator 221, a controller 223, and an external communicator 225.

The in-vehicle communicator 221 may communicate with the aforementioned information input devices 211, 213, 215, and 217. To this end, the in-vehicle communicator 221 may include various types of input and output ports. For example, the in-vehicle communicator 221 may include a port for supporting signal standard for transmission of at least one of RGB, composite (CVBS), super video (S-VIDEO), progressive (Y/Pb/Pr, Y/Cb/Cr), digital video (DVI, HDMI), or RF video in order to receive an image signal from the rear camera 211.

The in-vehicle communicator 221 may include a transceiver based on a vehicle communication protocol, e.g., a controller area network (CAN) protocol for communication with the in-vehicle controller 213 or the sensors 215 and 217.

The external communicator 225 may exchange data based on a predetermined protocol with the smart device 100 under control of the controller 223. In this case, the protocol for data exchange may not be limited to any specific protocol as long as short-distance wireless communication is enabled, but the rear camera image may be assumed to be transmitted to the smart device 100, and thus, the corresponding protocol may be WiFi or Wi-Di in consideration of a transmission capacity.

The controller 223 may generate data to be transmitted to the smart device 100 based on the rear camera image received through the in-vehicle communicator 221 and collected information in the vehicle. For example, the controller 223 may include a decoder and may convert an analog image signal transmitted from the rear camera 211 into digital streaming data based on a predetermined protocol (e.g., BT656). The controller 223 may perform image-based detection from the decoded image and may determine whether a new object appears to determine whether an obstacle is present. The controller 223 may measure communication delay between the external communicator 225 and the smart device 100, may activate the rear camera 211 to acquire a rear camera image when recognizing that a gear stage is a rear (R) gear stage through the gear shift controller 213, and may correct the rear camera image in consideration of delay and a vehicle speed when checking that the vehicle speed is not 0 through the vehicle seed sensor.

The image may be corrected in order to overcome a problem in terms of image delay due to communication delay. In more detail, when the rear camera image is directly transmitted to the smart device 100 without image correction, an image output to the smart device 100 may be an image of a previous time corresponding to communication delay, and thus, an actual rear situation may not be expressed. The image correction means that a current image is previously processed to an image to be seen at a time after the current image is delayed so as to be close to an image to be input to the rear camera 211 when a vehicle is reversed by a distance corresponding to "delay×vehicle speed" at the current time.

The image correction may have two types under assumption of a reverse situation. One type is a method (i.e., digital zoom) of enlarging a currently input image to an original size after cropping in consideration of a vehicle speed and delay, and the other one type is zoom-in control of the rear camera 211 when the rear camera 211 provides an optical zoom function. A detailed form of image correction will be described below with reference to FIGS. 4A and 4B.

A procedure of outputting a rear image based on the aforementioned configuration of the rear image output system is shown in a flowchart of FIG. 3.

FIG. 3 is a flowchart showing an example of a procedure of outputting a rear image according to another form of the present disclosure. In FIG. 3, a data path is assumed to be previously established to exchange data between a vehicle and a smart device through a predetermined communication protocol.

Referring to FIG. 3, the image processor 220 may monitor whether a current gear stage is an R gear stage (S310), and in the case of the R gear stage (YES of S310), the image processor 220 may activate the rear camera 211 and may determine communication delay with the smart device 100 and a vehicle speed (S320). The communication delay may use a general ping method and may also use a time stamp method, but the present disclosure is not limited thereto.

The image processor 220 may perform image correction processing on the rear camera image input from the rear camera 211 in consideration of delay and a vehicle speed (S330). For example, when a gear stage is shifted to an R gear stage but a vehicle speed is 0, image correction processing may not be performed. In contrast, when the vehicle speed is not 0, the image processor 220 may correct a current rear camera image to an image to be seen when a vehicle is reversed by "vehicle speed×delay". As described above, when an optical zoom method is applied, the current operation may be accompanied by a procedure of changing zoom magnification of the rear camera 211 in consideration of a vehicle speed and delay.

When correction is completed, the image processor 220 may transmit a corrected image to the smart device 100 (S340).

When a new object is recognized through image analysis or an obstacle is detected through the rear sensor 217 (YES of S350), the image processor 220 may immediately output a warning through a predetermined output device (e.g., a speaker) (S360). This is because an image displayed on the smart device 100 through image correction satisfies a sense of actual distance but desires communication delay until appearance of a new obstacle is applied.

Then, when a state of an R gear stage of a transmission is released (No of S310), an image transmission procedure may be terminated.

Figure 4A:
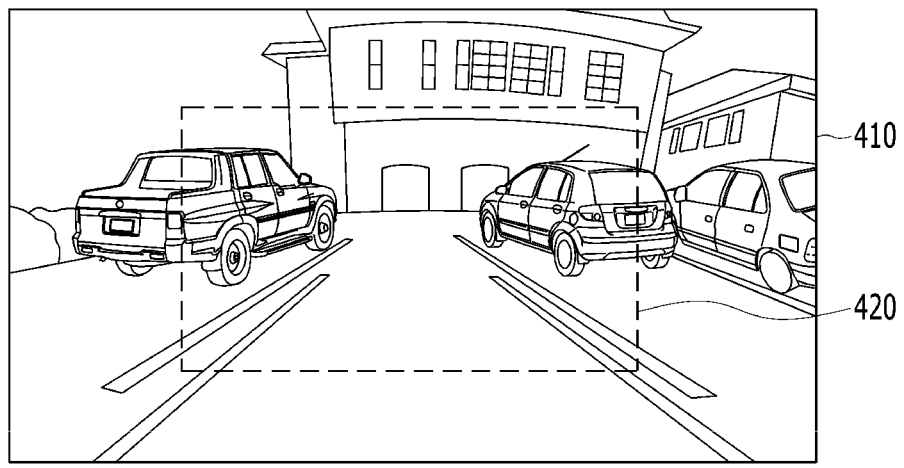
FIGS. 4A and 4B are diagrams respectively illustrating a concept of image processing in some forms of the present disclosure.
Figure 4B:
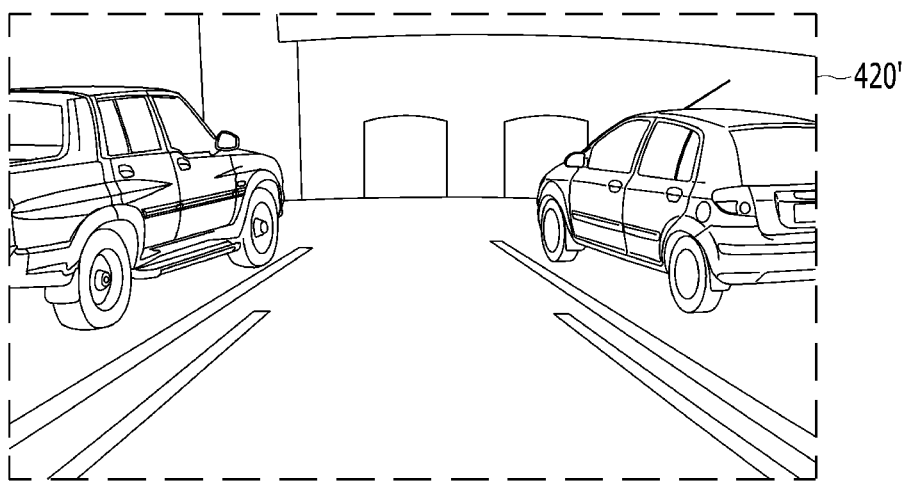

FIGS. 4A and 4B are diagrams for respectively explaining a concept of image processing in one form of the present disclosure. In detail, FIG. 4A shows an image 410 that is currently acquired by the rear camera 211. FIG. 4B shows a corrected image 420' to be transmitted to the smart device 100 through image correction processing.

First, referring to FIG. 4A, when a vehicle speed is not 0 while a vehicle is reversed, an image acquired through the rear camera 211 at a time point after communication delay may be an image inside a viewing angle of the rear camera 211 when the vehicle is actually reversed by vehicle speed× delay. That is, in the image at the time point after communication delay, an object positioned backward may be seen closer than the present. Thus, the image 420' shown in FIG. 4B may be acquired by enlarging the part 420, to be seen from the current image 410 in a situation in which the vehicle is moved by vehicle speed×delay, to an original size through cropping, and when the image 420' is transmitted to the smart device 100, a sense of actual distance may be achieved at a corresponding output time.

Needless to say, an image corresponding to the image 420' to be transmitted may also be achieved through a zoom-in function of the rear camera 211 as described above.

A subject of image processing in the aforementioned form is a vehicle side, but according to another form, the smart device 100 may also perform image processing, which will be described with reference to FIG. 5.

Figure 5:
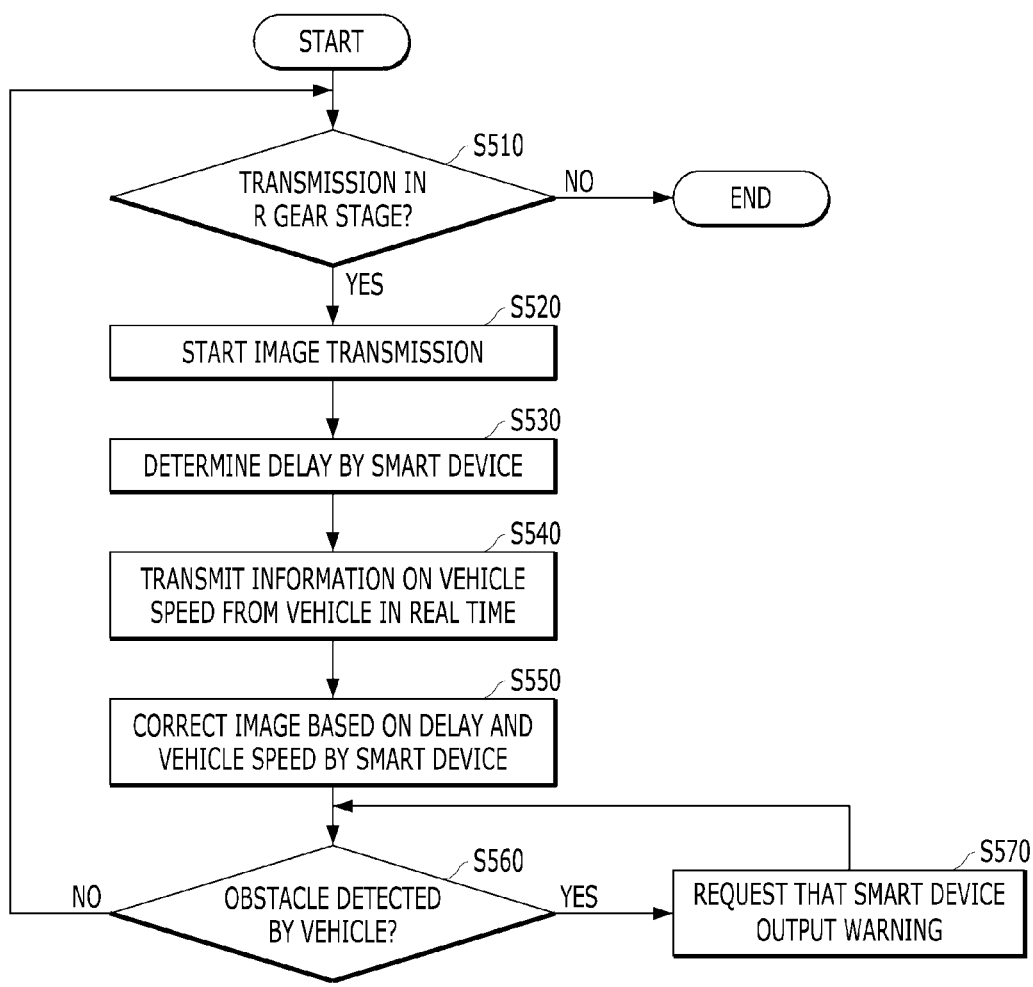
FIG. 5 is a flowchart showing an example of a procedure of outputting a rear image in another form of the present disclosure.

FIG. 5 is a flowchart showing an example of a procedure of outputting a rear image according to another form of the present disclosure. Similarly to FIG. 3, a data path is assumed to be previously established to exchange data between a vehicle and a smart device through a predetermined protocol.

Referring to FIG. 5, the image processor 220 may monitor whether a current gear stage is an R gear stage (S510), and in the case of the R gear stage (YES of S510), the image processor 220 may activate the rear camera 211 and may immediately start image transmission (S520).

The smart device 100 may determine communication delay with the image processor 220 (S530) and the vehicle may transmit information on a vehicle speed to the smart device 100 in real time (S540).

Thus, the smart device 100 may correct the received image using a digital zoom method based on the delay and the vehicle speed and may output the corrected image through a display of the smart device 100 (S550).

When a new object is recognized through image analysis or an obstacle is detected through the rear sensor 217 (YES of S560), the image processor 220 of the vehicle may immediately request that the smart device 100 output a warning (S570). In one form, a warning may also be output through another output device (e.g., a speaker) of the vehicle itself.

When a state of an R gear stage is released (NO of S510), the image processor 220 may stop transmission of a rear camera image.

Through the aforementioned forms, a sense of unfamiliarity due to delay of a rear image from communication delay may be removed, and a vehicle side may immediately output a warning according to whether a rear obstacle appears, and thus, a safety problem may also be overcome.

According to the aforementioned forms, in order to prevent a sense of unfamiliarity of a driver due to sudden image correction, zoom-in magnification or a size of a crop region may be limited stepwise in a predetermined level until a predetermined time or a predetermined vehicle speed from initial start is reached.

In the vehicle related to at least one form of the present disclosure as configured above, when a rear image may be transmitted to a separate terminal, image processing may be performed on the image in consideration of the vehicle speed and communication delay and then the image may be output from a terminal, thereby overcoming an issue in terms of image delay.

It will be appreciated by persons skilled in the art that that the effects that could be achieved with the present disclosure are not limited to what has been particularly described hereinabove and other advantages of the present disclosure will be more clearly understood from the detailed description.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations can be made in the present disclosure without departing from the spirit or scope of the present disclosure. Thus, it is intended that the present disclosure cover the modifications and variations of this present disclosure.

What is claimed is:

1. A method of providing a rear image of a vehicle, the method comprising:
   setting, by a processor, a data path with a smart device;
   acquiring, by the processor, a rear image from a rear camera of the vehicle;
   correcting, by the processor, the acquired rear image based on a vehicle speed of the vehicle and a delay that occurs in the data path; and
   transmitting, by the processor, the corrected rear image to the smart device,
   wherein correcting the acquired rear image includes: acquiring an image corresponding to a viewing angle to be seen at a distance at which the vehicle is reversed during the delay, and
   wherein acquiring the image corresponding to the viewing angle includes: performing a zoom-in control on the rear camera proportional to the delay and the vehicle speed.

2. The method of claim 1, wherein acquiring the rear image is performed while a transmission of the vehicle is in a rear gear stage.

3. The method of claim 1, wherein acquiring the image corresponding to the viewing angle further includes:
   cropping a predetermined range in the acquired rear image based on the delay and the vehicle speed; and
   enlarging the cropped image to an original size.

4. A non-transitory computer-readable having a program recorded thereon, the program to direct a processor to perform acts of:
   setting a data path between a smart device and a vehicle;
   acquiring a rear image from a rear camera of the vehicle;
   correcting the acquired rear image based on a vehicle speed of the vehicle and a delay that occurs in the data path; and
   transmitting the corrected rear image to the smart device,
   wherein correcting the acquired rear image includes:
      acquiring an image corresponding to a viewing angle to be seen at a distance at which the vehicle is reversed during the delay, and
   wherein acquiring the image corresponding to the viewing angle includes: performing a zoom-in control on the rear camera proportional to the delay and the vehicle speed.

5. A vehicle comprising:
   a rear camera; and
   an image processor configured to:
      set a data path between a smart device and the vehicle,
      acquire a rear image from the rear camera,
      correct the acquired rear image based on a vehicle speed and a delay that occurs in the data path, and
      transmit the corrected rear image to the smart device,
      wherein the image processor is further configured to:
         acquire an image corresponding to a viewing angle to be seen at a distance at which the vehicle is reversed during the delay, and
         acquire the corrected rear image by performing a zoom-in control on the rear camera proportional to the delay and the vehicle speed.

6. The vehicle of claim 5, wherein the image processor is configured to acquire the rear image while a transmission of the vehicle is in a rear gear stage.

7. The vehicle of claim 5, wherein the image processor is configured to:
   acquire the corrected rear image by cropping a predetermined range in the acquired rear image based on the delay and the vehicle speed, and
   enlarge the cropped image to an original size.

* * * * *